(12) United States Patent
Driemeyer et al.

(10) Patent No.: US 8,844,877 B1
(45) Date of Patent: Sep. 30, 2014

(54) STAY SHARP, FAIL SAFE LEADING EDGE CONFIGURATION FOR HYPERSONIC AND SPACE ACCESS VEHICLES

(75) Inventors: Daniel E. Driemeyer, Manchester, MO (US); John C. Waldrop, III, Saint Peters, MO (US); Victor Blakemore Slaughter, Manchester, MO (US); Jonathan D. Embler, Tustin, CA (US); James P. Ledesma, Long Beach, CA (US); Robert D. Keeler, Jr., Maryland Hts., MO (US)

(73) Assignee: The Boeing Company, Chicago, IL (US)

( * ) Notice: Subject to any disclaimer, the term of this patent is extended or adjusted under 35 U.S.C. 154(b) by 1262 days.

(21) Appl. No.: 12/874,228

(22) Filed: Sep. 2, 2010

(51) Int. Cl.
  *B64G 1/52* (2006.01)
  *B64C 1/38* (2006.01)

(52) U.S. Cl.
  CPC ........................................ *B64C 1/38* (2013.01)
  USPC .................... 244/171.7; 244/117 A; 244/133; 244/171.8

(58) Field of Classification Search
  USPC ........... 244/35 A, 159.1, 159.3, 171.7, 171.8, 244/133, 117 A
  See application file for complete search history.

(56) References Cited

U.S. PATENT DOCUMENTS

| | | | | |
|---|---|---|---|---|
| 3,129,754 A | * | 4/1964 | Menzel | 165/83 |
| 3,583,275 A | * | 6/1971 | Duflos | 87/57 |
| 3,682,100 A | * | 8/1972 | Lindberg, Jr. | 244/159.1 |
| 3,785,591 A | * | 1/1974 | Stalmach, Jr. | 244/171.8 |
| 4,014,485 A | * | 3/1977 | Kinnaird et al. | 244/117 A |
| 4,671,348 A | * | 6/1987 | Bauer | 165/41 |
| 4,923,146 A | * | 5/1990 | Anthony | 244/117 A |
| 4,949,920 A | * | 8/1990 | Schindel et al. | 244/117 A |
| 4,966,229 A | * | 10/1990 | Senterfitt et al. | 165/41 |
| 5,077,103 A | * | 12/1991 | Wagner et al. | 428/34.1 |
| 5,257,757 A | * | 11/1993 | Paul et al. | 244/117 A |
| 5,291,830 A | * | 3/1994 | Zwan | 102/293 |
| 5,452,866 A | * | 9/1995 | Bulman | 244/117 A |
| 5,720,339 A | * | 2/1998 | Glass et al. | 165/104.26 |
| 6,746,755 B2 | * | 6/2004 | Morrison et al. | 428/166 |
| 7,377,469 B2 | * | 5/2008 | Cherian | 244/159.1 |
| 2006/0145020 A1 | * | 7/2006 | Buehler | 244/171.8 |
| 2007/0234566 A1 | * | 10/2007 | Hsu | 29/890.03 |
| 2008/0307649 A1 | * | 12/2008 | Dos Santos E Lucato | 29/890.03 |
| 2010/0236759 A1 | * | 9/2010 | Wadley et al. | 165/104.19 |

OTHER PUBLICATIONS

John H. Rosenfeld and Donald M. Ernst, "Advances in Refractory Metal Heat Pipe Technology", Proc. 11th Annual. International Heat Pipe Conference, Tokyo, Japan, 1999, pp. 407-413.

Edward J. Klock-McCook, John J. Podhiny, Brian J. Sullivan, Suraj R. Rawal, John H. Rosenfeld, Tim McKechnie, Anatoliy Shchetkovskiy, "Design Solutions from Thermal-Structural Analysis of Sharp Heat Pipe Cooled Cowl Leading Edges", National Space & Missile Materials Symposium: Jun. 28-Jul. 1, 2010 Scottsdale, AZ.

(Continued)

*Primary Examiner* — Timothy D Collins
*Assistant Examiner* — Jamie S Stehle
(74) *Attorney, Agent, or Firm* — Ameh IP; Lowell Campbell; Elahe Toosi (57) ABSTRACT

A passive non-ablating thermally protective structure body is disclosed. An improved-reliability heat pipe edge comprises a non-porous material formed into a wedge-shaped chamber, and a porous layer. The porous layer extends from interior surfaces of the non-porous material to provide capillary wicking.

20 Claims, 7 Drawing Sheets

(56) References Cited

OTHER PUBLICATIONS

Charles J. Camarda, NASA TP-1320: "Aerothermal Tests of a Heat-Pipe-Cooled Leading Edge at Mach 7" (Nov. 1978).
Warner B. Kaufman and Leonard K. Tower, AD-A170 601: "Compatibility of Sodium and Lithium in Superalloy Heat Pipes" (Apr. 1985).
Calvin C. Silverstein, NASA Contractor Report 4036: "Heat Pipe Cooling for Scramjet Engines" (Dec. 1986).
D. M. Ernst and G. Y. Eastman, AIAA-85-0981: "High Temperature Heat Pipe Technology at Thermacore—An Overview" presented at the AIAA 20th Thermophysics Conference, Jun. 19-21, 1985 in Williamsburg, Virginia.
D. L. Jacobson and B. S. Lou, AIAA-86-1272: "Sodium, Inconel 600 Heat Pipe Life Test Analysis" presented at the AIAA/ASME 4th Joint Thermophysics and Heat Transfer Conference, Jun. 2-4, 1986 in Boston, Massachusetts.
L. T. Clark and G. S. Glenn, AIAA-88-2679: "Design Analysis and Testing of Liquid Metal Heat Pipes for Application to Hypersonic Vehicles" presented at the AIAA Thermophysics, Plasmadynamics, and Lasers Conference, Jun. 27-29, 1988 in San Antonio, Texas.
W. Chang and J. Brown, AIAA-96-0478: "Operation of the Liquid-Metal Heat Pipe in Applications Involving Aerodynamic Heating" presented at the AIAA 34th Aerospace Sciences Meeting and Exhibit, Jan. 15-18, 1996 in Reno, Nevada.
Scott D. Kasen and Haydn N. G. Wadley, "Multifunctional Thermal Protection Concepts for Hypersonic Vehicles" presented at the MURI: Revolutionary Materials for Hypersonics review meeting held Jul. 22, 2009.
Scott D. Kasen, "A Dynamic Equilibrium Analysis of a Leading Edge Thermal Heat Spreader Using a Cubic Equation of State" downloaded Mar. 26, 2010 from http://www.vsgc.odu.edu/src/SRC07/SRCO7papers/Scott%20Kasen_VSGC%20Paper_07.pdf.
Edward J. Klock-McCook, John Podhiny, Brian Sullivan, Suraj R. Rawal, and John Rosenfeld, "Thermal-structural Analysis of Module Joint for Heat Pipe Cooled Cowl Leading Edges" presented at the National Space & Missile Materials Symposium, Jun. 22-26, 2009 in Henderson, Nevada.
Douglas R. Adkins, K. Scott Rawlinson, Charles E. Andraka, Steven K. Showalter, James B. Moreno, Timothy A. Moss, and Patricia G. Cordiero, SAND-98-1393C: "An Investigation of Corrosion in Liquid-Metal Heat Pipes" (1998).
Craig A. Steeves, Ming Y. He, and Anthony G. Evans, "The Influence of Coatings on the Performance of Structural Heat Pipes for Hypersonic Leading Edges" in the Journal of the American Ceramic Society 92 [2] 553-555 (2009).
Robert S. Reid, J. Tom Sena, and Michael A. Merrigan, "Transient Tests of a Molybdenum-Lithium Heat Pipe" submitted to the 11th International Heat Pipes Conference.
Craig A. Steeves, Ming Y. He, Scott D. Kasen, Lorenzo Valdevit, Haydn N. G. Wadley, and Anthony G. Evans, "Feasibility of Metallic Structural Heat Pipes as Sharp Leading Edges for Hypersonic Vehicles" in the Journal of Applied Mechanics 76 [3] 031014 (May 2009).
"Machined Titanium Heat-Pipe Wick Structure" in NASA Tech Briefs, describing the work of John H. Rosenfeld, Kenneth G. Minnerly, and Nelson J. Gernert of Thermacore Inc. for NASA Glenn Research Center. Published Jan. 1, 2009 and available from http://www.greenproductdesignanddevelopment.com/component/content/article/3494.
Suraj Rawal, AFRL-RB-WP-TR-2007-3099: "Air Vehicle Technology Integration Program (AVTIP) Delivery Order 0030: Heat-Pipe-Cooled Leading Edges (HPCLE) for Space Operations Vehicle, Final Report" pp. XX (Jul. 2007).
Ulf Ackelid, Technical Report: "The nickel-based superalloy IN 625 produced with the Arcam EBM process: A feasibility study" (Jun. 14, 2006).
Ashby, Evans, Fleck, Gibson, Hutchinson, and Wadley, Metal Foams: A Design Guide, Butterworth Heinemann, 2000 (pp. 43-44, 180).
Ellerby, Irby, Squire, Olejniczak, Johnson, Beckman, Gasch, Gusman, Stackpoole, Sannes, Draper, and Kustas, "Development of Ultra High Temperature Ceramics for Sharp Leading Edge Applications" presented at the 27th Annual Conference on Composites, Materials and Structures in Cocoa Beach, Florida (Jan. 29, 2003).
W. Joseph Mantle and Won Soon Chang, "Effective Thermal Conductivity of Sintered Metal Fibers" (IEEE Document # 899034)

\* cited by examiner

STAY SHARP, FAIL SAFE LEADING EDGE CONFIGURATION FOR HYPERSONIC AND SPACE ACCESS VEHICLES

FIELD

Embodiments of the present disclosure relate generally to aerospace parts. More particularly, embodiments of the present disclosure relate to parts for a leading edge of an aerospace vehicle.

BACKGROUND

In aerodynamics, hypersonic speeds are generally speeds that are highly supersonic, for example, speeds above Mach 5. Reusable hypersonic and space access vehicles for applications such as "Prompt Global Strike" will be able to swiftly reach targets thousands of miles from a take-off or launch point. These vehicles will require sharp low angle leading edges for the nose, engine cowls, control surfaces, and running leading edges. Since few or no materials can handle required high temperatures without cooling, a high heat flux on these low angle (about 10°) edges must be managed by an active cooling system. Heat-pipe-cooled leading edges have been studied for many years, but improved designs and manufacturing methods are needed. The Air Force Research Laboratory has identified a list of heat pipe leading edge technical challenges that includes heat-pipe performance optimization, structural integrity, improved reliability/producibility, fail-safe operation, and flight-weight hardware.

SUMMARY

A passive non-ablating thermally protective structure body is disclosed. The passive non-ablating thermally protective structure body comprises a modular, replaceable improved-reliability heat pipe edge coupled to a fail-safe passive edge. The improved-reliability heat pipe leading edge comprises a non-porous material forming a wedge-shaped chamber comprising a porous layer extending from interior surfaces of the non-porous material to provide capillary wicking of a cooling fluid. The fail-safe passive edge provides a secondary thermal protection substantially equivalent to a primary thermal protection provided by the improved-reliability heat pipe edge. In this manner, the fail-safe passive edge provides for continued vehicle operation at hypersonic speeds in the event that functionality of the improved-reliability heat pipe edge in not optimum. High-reliability methods for fabricating the improved-reliability heat pipe edge component are used to improve on high-temperature heat pipe non-optimum mechanisms.

In a first embodiment, a passive non-ablating thermally protective structure body comprises an improved-reliability heat pipe edge configuration comprising a non-porous material, and a porous layer. The non-porous material is formed into a wedge-shaped chamber. The porous layer extends from interior surfaces of the non-porous material to provide capillary wicking.

In a second embodiment, a method provides a passive non-ablating thermally protective structure body. In this manner, the method forms an improved-reliability heat pipe edge by forming a non-porous material into a wedge-shaped chamber, and then forms a porous layer extending from interior surfaces of the non-porous material to provide capillary wicking.

In a third embodiment, a method for using an improved-reliability thermally protective structure body comprises filling improved-reliability heat pipe edge means with a transpiring coolant. The method then circulates the transpiring coolant through a porous layer of the heat pipe edge means via capillary wicking. The method then vaporizes the transpiring coolant into a gas at a high temperature edge of the porous layer, thereby cooling a structure of a non-porous material of the improved-reliability heat pipe edge means. The method then condenses the gas into a liquid at relatively cooler portions of a wedge-shaped chamber that extends from the non-porous material and circulates the transpiring coolant to an edge of the porous layer via the capillary wicking.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to manufacturing, thermodynamics, aerodynamics, structure assembly, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, a leading edge of an aircraft. Embodiments of the disclosure, however, are not limited to such leading edge applications, and the techniques described herein may also be utilized in other thermal protection applications. For example, embodiments may be applicable to engine components, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
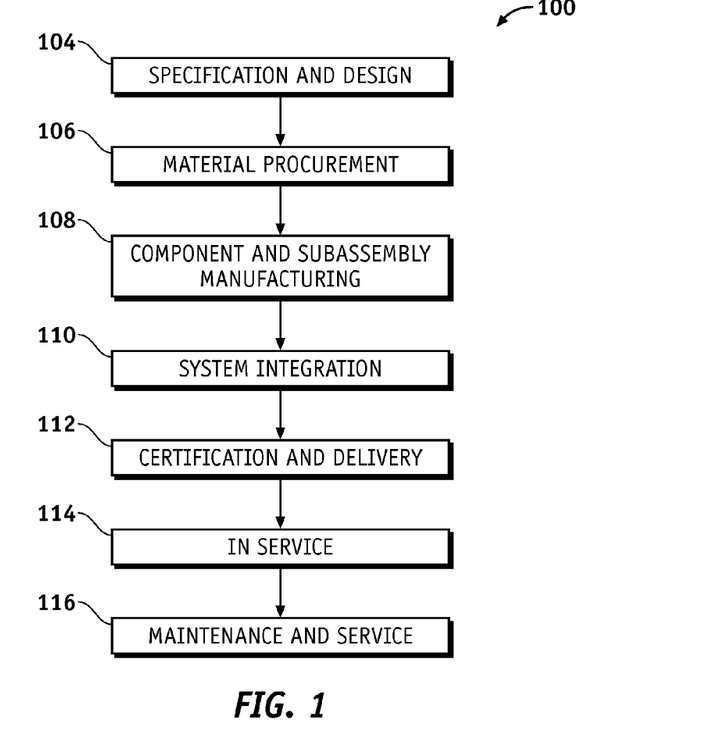
FIG. 1 is an illustration of a flow diagram of an exemplary aircraft production and service methodology.
Figure 2:
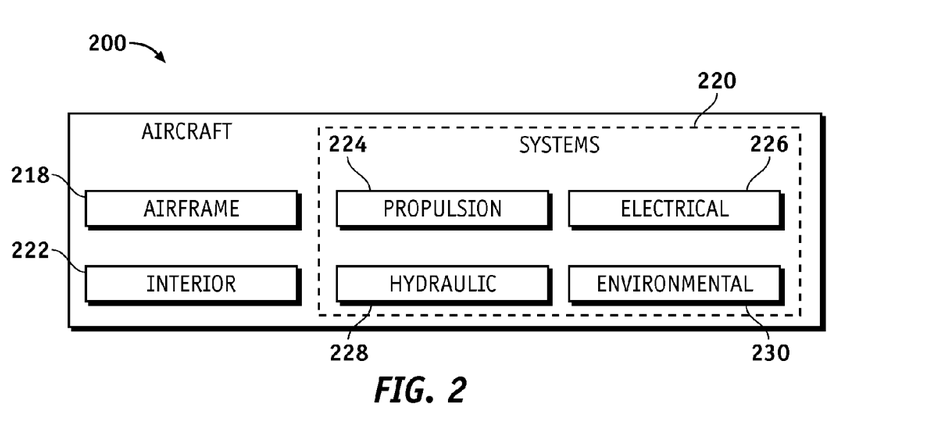
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. Also, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
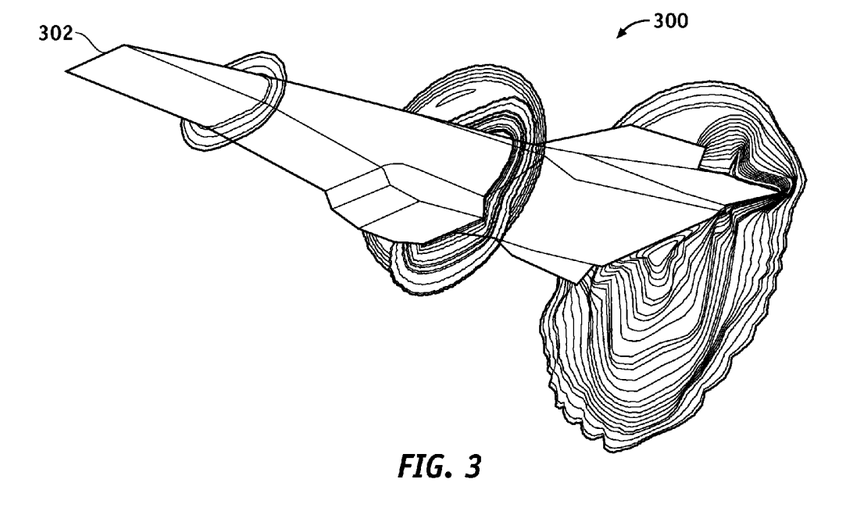
FIG. 3 is an illustration of an exemplary hypersonic space access aerospace vehicle comprising a stay sharp fail-safe leading edge according to an embodiment of the disclosure.

FIG. 3 is an illustration of an exemplary hypersonic space access aerospace vehicle 300 comprising a stay sharp fail-safe leading edge 302 according to an embodiment of the disclosure. The hypersonic space access aerospace vehicle 300 may operate, for example but without limitation, at speeds about Mach 5 to about Mach 20 depending on a material used to build the aerospace vehicle 300, and may be subject to leading edge temperatures, for example but without limitation, greater than 1200° C.

Figure 4:
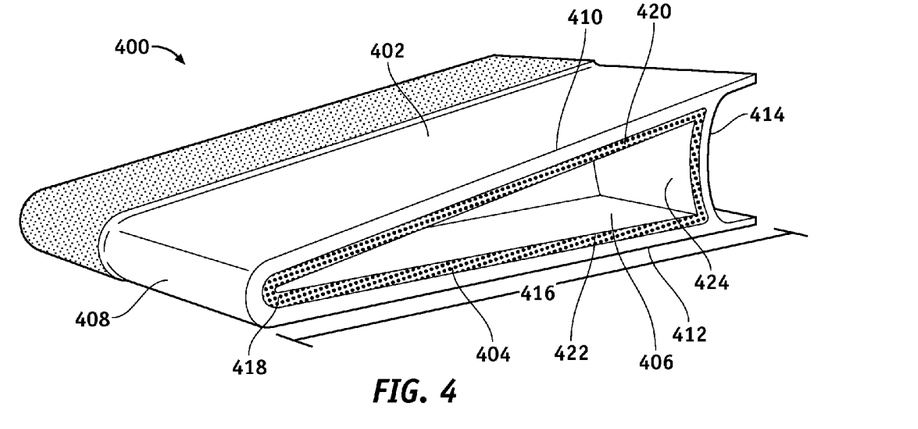
FIG. 4 is an illustration of a perspective view of an exemplary improved-reliability heat pipe leading edge of a stay sharp fail-safe leading edge according to an embodiment of the disclosure.

FIG. 4 is an illustration of a perspective view of an exemplary heat pipe leading edge 400 of the stay sharp fail-safe leading edge 302 according to an embodiment of the disclosure. The heat pipe leading edge 400 comprises a high temperature surface 402 (non-porous material), an internal wick structure 404 (porous layer), and an internal plenum chamber 406 (chamber).

The high temperature surface 402 (non-porous material) comprises a leading edge 408, a first sidewall 410, a second sidewall 412, and an end cap 414. The high temperature surface 402 encloses the internal wick structure 404 and the internal plenum chamber 406, thereby forming a heat pipe. A working fluid (not shown) circulates as a liquid through the internal wick structure 404 via capillary wicking and vaporizes into a gas at a wick leading edge 418 due to high temperature, thereby cooling a structure of the non-porous material such as the leading edge 408. The working fluid condenses into a liquid in the internal plenum chamber 406 at relatively cooler portions of the first sidewall 410, the second sidewall 412 and the end cap 414, and circulates to the leading edge 418 of the internal wick structure 404 via capillary wicking. The working fluid (transpiring coolant) is contained within the internal plenum chamber 406 (wedge-shaped chamber) and is operable to flow as vapor in the internal plenum chamber 406 (wedge-shaped chamber) and as a liquid in the internal wick structure 404 (porous layer). The high temperature surface 402 may be, for example but without limitation, about 32.5 cm in length, and the like. The high temperature surface 402 comprises a non-porous material, such as but without limitation, superalloys, refractory metals, nobel metals, niobium silicides, molybdenum borosilicides, silicon carbide, ceramic, ceramic metal composites, ceramic matrix composites, and the like.

The internal wick structure 404 forms a porous layer comprising the wick leading edge 418, a first wick sidewall 420, a second wick sidewall 422, and a wick end cap 424. The internal wick structure 404 comprises, for example but without limitation, pores, void, channels, and the like. The internal wick structure 404 comprises the working fluid (transpiring coolant) and retains the working fluid through, for example but without limitation, capillary action (capillary wicking), and the like. The working fluid may comprise, for example but without limitation, a liquid, gas, vapor, or the like, during flight conditions and, for example but without limitation, a liquid, a solid, or the like, during non-flight conditions. The working fluid may comprise, for example but without limitation, liquid sodium, liquid lithium, potassium, molten salt, and the like. The working fluid may weigh, for example but without limitation, about 5-10 grams, and the like.

The internal plenum chamber 406 has a wedge-shape formed by the non-porous material (e.g., high temperature surface 402) and comprises an open space (not shown) for circulation of a gaseous phase of the working fluid. The high temperature surface 402, the internal wick structure 404, and the internal plenum chamber 406 may be made as individual pieces or formed as an integrated part through, for example but without limitation, plunge electric discharge machining, additive manufacturing, and the like.

In one embodiment, the heat pipe leading edge 400 is made by, for example but without limitation, a plunge electric discharge machining process. Plunge electric discharge machining, is a manufacturing process whereby a desired shape is obtained by removing material from a workpiece by a series of rapidly recurring electric current discharges between electrodes separated by a dielectric liquid. The dielectric liquid can be used to carry debris from the work area. The plunge electric discharge machining process may start with a wrought metal plate (e.g., 2.5" thick). Features are machined on the high temperature surface 402 and the internal plenum chamber 406, e.g., via conventional machining. Plunge electrical discharge machining is then used to finish high aspect ratio portions of the internal plenum chamber 406 such as a portion near the leading edge 408 while assuring that a desired wall thickness of, for example but without limitation, about 0.16 cm, and the like. The internal wick structure 404 may be installed by, for example but without limitation, diffusion bonding, induction or e-beam bonding/brazing, electro-joining, and the like. Such methods may provide a good metallurgical interface of the internal wick structure 404 with the high temperature surface 402 for proper heat pipe operation. The end cap 414 is welded to other portions of the high temperature surface 402 such as the first sidewall 410 and the second sidewall 412 by, for example but without limitation, vacuum electron-beam welding, TIG welding, and the like.

Additive manufacturing is a process of joining materials to make objects from 3D model data. For example, layers may be added one layer upon another layer, as opposed to subtractive (i.e., removing material) manufacturing methodologies. Examples of additive manufacturing comprise, for example but without limitation, Stereolithography, Laser based additive manufacturing, Electron beam melting, Aerosol jetting, Inkjet deposition, Semi-solid freeform fabrication, and the like. In stereolithography, an additive manufacturing process uses a vat of laser curable material and a laser to construct parts one layer at a time. For each layer, a laser beam traces a cross-section pattern on the surface of the vat of laser curable material. The laser exposures thereby solidifying the cross-section pattern on the laser curable material, which adheres to a previous layer below. After the cross-section has been traced, the solidified material is lowered by a single layer thickness and a fresh laser curable material is coated on the previous. The process is repeated until a complete 3-D part is formed. In laser based additive manufacturing a laser is directing on a substrate to create a melt pool, and a desired geometry is created by rastering the laser across a substrate while material is non-porously added. In electron beam melting, a metal powder is melted layer per layer by an electron beam in a high vacuum resulting in fully-dense void-free high-strength parts. In aerosol jetting, a focused stream of atomized particles is directed to a substrate, and a velocity of the focused stream impacts the particles on the substrate. In inkjet deposition, individual droplets of material are propelled to a workpiece, and the droplets change phase to solid upon deposition in a pattern on the workpiece. The phase change could be by, for example but without limitation, heat transfer, light, chemical reaction, and the like. The droplets may comprise a liquid, a particle suspension, and the like. In semi-solid freeform fabrication, a semi-solid slurry of metallic alloy is deposition in a layering process.

In one embodiment, the heat pipe leading edge 400 is made by, for example but without limitation, additive manufacturing followed by hot isostatic pressing (HIP) to build up the internal wick structure 404 from metal powder. In this manner, the internal wick structure 404 and the end cap 414 are formed simultaneously with the internal plenum chamber 406. This integral internal wick structure 404 (shell-wick) fabrication approach forms a high-quality bond between the internal wick structure 404 and the high temperature surface 402. The high-quality bond provides a high-performance and reliable operation of the heat pipe leading edge 400 in a finished component. The additive approach could also facilitate integral formation of the end cap 414 as a part of the high temperature surface 402 leaving a small liquid-metal fill tube 510 (FIG. 5) opening in the high temperature surface 402.

In one embodiment, the high temperature surface 402 is made from metal powder using the additive manufacturing process; however, the internal wick structure 404 is fabricated separately and attached to the high temperature surface 402 as described below in the context of FIG. 6. The end cap 414 is coupled to the high temperature surface 402 after insertion of the internal wick structure 404 via, for example but without limitation, welding, and the like.

Figure 5:
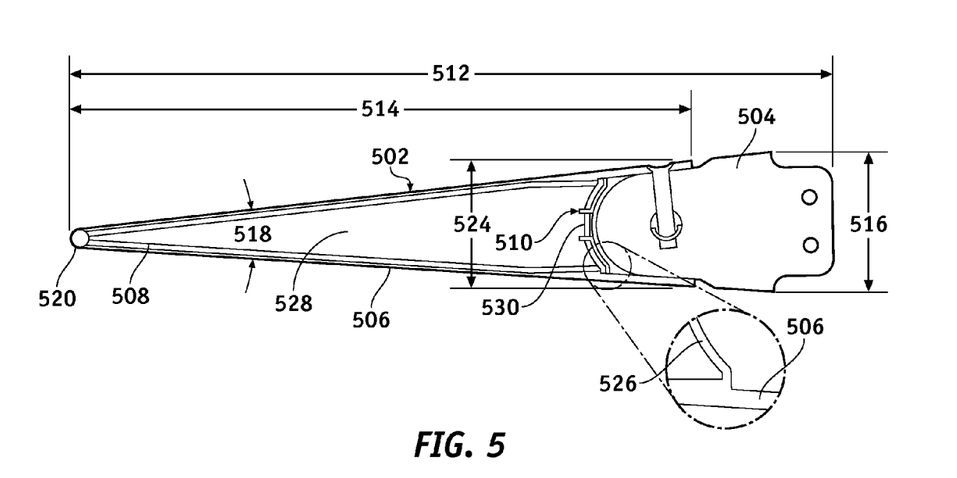
FIG. 5 is an illustration of a cross-sectional view of an exemplary stay sharp fail-safe leading edge according to an embodiment of the disclosure.

FIG. 5 is an illustration of a cross-sectional view of an exemplary stay sharp fail-safe leading edge 500 according to an embodiment of the disclosure. The stay sharp fail-safe leading edge 500 comprises a heat pipe leading edge 502 (400 in FIG. 4) and a fail-safe passive edge 504. The stay sharp fail-safe leading edge 500 may have, for example but without limitation, about 32.5 cm of length 512 (416 in FIG. 4), about 10 degrees of a tip angle 518, about 0.4 cm of tip radius 520, and the like.

The heat pipe leading edge 502 comprises a high temperature surface 506 (402 in FIG. 4), a wick structure inner surface 508, and the fill tube 510 in an end cap 526, and a plenum chamber 528. The fill tube 510 is operable to fill the heat pipe leading edge 502 with the working fluid mentioned above (i.e., transpiring liquid or transpiring coolant). The high-temperature surface 506 may have a thickness of, for example but without limitation, about 0.16 cm, and the like. The wick structure inner surface 508 forms a porous layer having, for example but without limitation, a skin thickness (not shown) of about 0.2 cm, an overall width 524 of about 5.3 cm, an overall length 514 of about 26.5 cm, and the like. The fill tube 510 is sealed after insertion of the working fluid by, for example but without limitation, a plug 530, and the like.

The fail-safe passive edge 504 is configured to withstand temperatures and pressures equivalent to those required to be withstood by the high temperature surface 506. The fail-safe passive edge 504 comprises a substructure comprising a low coefficient-of-thermal-expansion material to provide a secondary thermal protection capability substantially equivalent to a primary thermal protection provided by the improved-reliability heat pipe edge (heat pipe leading edge 400/502). In this manner, the fail-safe passive edge 504 provides a back up structure for thermal protection in an event that the heat pipe leading edge 400 does not function optimally. The fail-safe passive edge 504 may have a width 516 of, for example but without limitation, 5.9 cm, and the like. The fail-safe passive edge 504 may comprise, for example but without limitation, a three-dimensional reinforced material such as a partially densified, Carbon-fiber Carbon-matrix composite (C-C) part that is further densified using Silicon Carbide (SiC) Polymer-Infiltration and Pyrolization (PIP) processing, and the like. The fail-safe passive edge 504 may be fabricated using three-dimensional carbon fiber weaving and high-pressure Pitch Infiltration and Carbonization (PIC) followed by a graphitization processing. Final densification of the fail-safe passive edge 504 may be completed using multiple SMP-10 SiC pre-ceramic polymer matrix infiltration and pyrolization steps. C-C/SiC material can survive leading edge temperatures expected for about Mach 7 flight conditions on the fail-safe passive edge 504 without substantial ablation or recession. C-C/SiC processing may be attractive because feature details of the fail-safe passive edge 504 can be machined in a pure C-C state using machining tools before finished parts are processed through SiC densification cycles.

The stay sharp fail-safe leading edge 500 has several advantages over laminated 2D C/C structures often considered for leading edge designs. Unlike such primary leading edge structures, the fail-safe passive edge 504 is not required to dissipate heat for long periods of time and will not require advanced phase change or active cooling to protect a primary structure in a short time it takes a vehicle to decelerate in an event that the heat pipe leading edge 502 may not be functioning optimally.

The fail-safe passive edge 504 can incorporate machined integration features (lugs) for coupling to other substructures, for example but without limitation, a wing spar (not shown), double shear fittings (not shown), and the like. The heat pipe leading edge 502 is attached to the fail-safe passive edge 504 such that primary bending loads are reacted in shear at the attachment bolts/fasteners 808/810 (FIG. 8) thereby avoiding high temperature tension fasteners. The floating barrel-nuts 614/804 are integrated through a channel (not shown) machined into the fail-safe passive edge 504. In this manner, the floating barrel-nuts 614/804 can slide within the channel acting as a linear bearing to accommodate thermal growth.

The stay sharp fail-safe leading edge 500 comprises many other advantages over existing designs. The stay sharp fail-safe leading edge 500 is simpler than other designs, and may use a smaller number of parts to make up an assembly. The stay sharp fail-safe leading edge 500 allows wedge-shaped high aspect ratio vapor chambers such as the internal plenum chamber 528/406 that can be aligned perpendicular to an edge of an aerodynamic body and provide enhanced heat pipe operation by allowing vapor to expand into the internal plenum chamber 528/406 when moving towards cooler portions of the first sidewall 410, the second sidewall 412 and the end cap 414 of the stay sharp fail-safe leading edge 500.

The stay sharp fail-safe leading edge 500 wedge-shaped vapor chambers such as the internal plenum chamber 528 can be fabricated either using conventional processes or advanced integral additive fabrication processes that do not require welds or other joints in highly-heated areas of the hypersonic space access aerospace vehicle 300. In contrast to the stay sharp fail-safe leading edge 500, assembly joints in a leading edge or sidewall regions can be points of non-optimal operation under cyclic thermal testing in existing liquid metal systems. The stay sharp fail-safe leading edge 500 employs an outer shell structure such as the high temperature surface 402/506 that can be fabricated from a single wrought super-alloy plate. A plunge EDM operation can be used to form the internal plenum chamber 528 features so that final close-out welds are located on a much cooler back condenser end of the stay sharp fail-safe leading edge 500 assembly.

The stay sharp fail-safe leading edge 500 provides an open wedge configuration that allows wick elements such as the wick structure inner surface 508 to be fabricated as flat patterns and formed to a required interior wedge angle such as the tip angle 518. The wick structure inner surface 508 can be inserted and bonded using simple weights to apply pressure on the wick structure inner surface 508 to promote good bonding. The stay sharp fail-safe leading edge 500 provides an integrated vapor chamber structure such as the internal plenum chamber 528 that can be formed from a single wrought plate, eliminating welds, and resulting in a substantial part count reduction, improved design for manufacturing, and robust structure at minimal weight compared to other approaches. The stay sharp fail-safe leading edge 500 provides a more open vapor heat chamber technology that simplifies component design of the heat pipe leading edge 502, improves reliability, reduces weight, and significantly enhances heat pipe performance by providing an open expanding vapor flow channel such as internal plenum chamber 528 for removing heat from the leading edge 408.

The stay sharp fail-safe leading edge 500 provides backup functionality with fail-safe features as explained in more detail below. For example, loss of one internal plenum chamber 528 will not result in a failure of the heat pipe leading edge 502. Furthermore, even if the internal plenum chamber 528 may function non-optimally and the heat pipe leading edge 502 may be disabled or removed, the fail-safe passive edge 504 located behind the heat pipe leading edge 502 is fully capable of getting the vehicle home safely.

Figure 6:
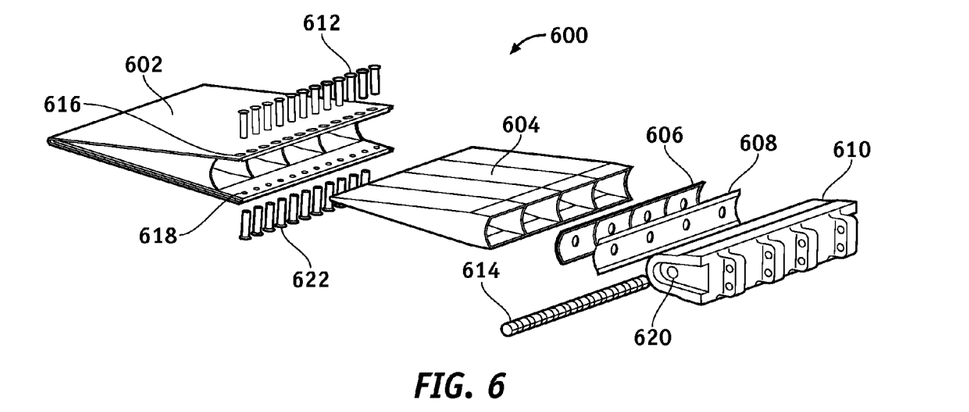
FIG. 6 is an illustration of an exemplary component breakdown of an exemplary stay sharp fail-safe leading edge according to an embodiment of the disclosure.

FIG. 6 is an illustration of an exemplary component breakdown of an exemplary stay-sharp fail-safe leading edge 600 comprising individual parts according to an embodiment of the disclosure. The stay sharp fail-safe leading edge 600 may comprise a high temperature surface 602 (402 in FIG. 4), a wick structure 604, a wick end cap 606, a surface end cap 608, and a fail-safe passive edge 610.

The wick structure 604 fits into the high temperature surface 602 and a surface of the wick structure 604 is complete by the wick end cap 606. The wick structure 604 and the wick end cap 606 are sealed into the high temperature surface 602 by the surface end cap 608. The surface end cap 608 may comprise the same material as the high temperature surface 602 or a different material. The surface end cap 608 may be coupled or bonded to the high temperature surface 602 by, for example but without limitation, welding, diffusion bonding, and the like.

Figure 8:
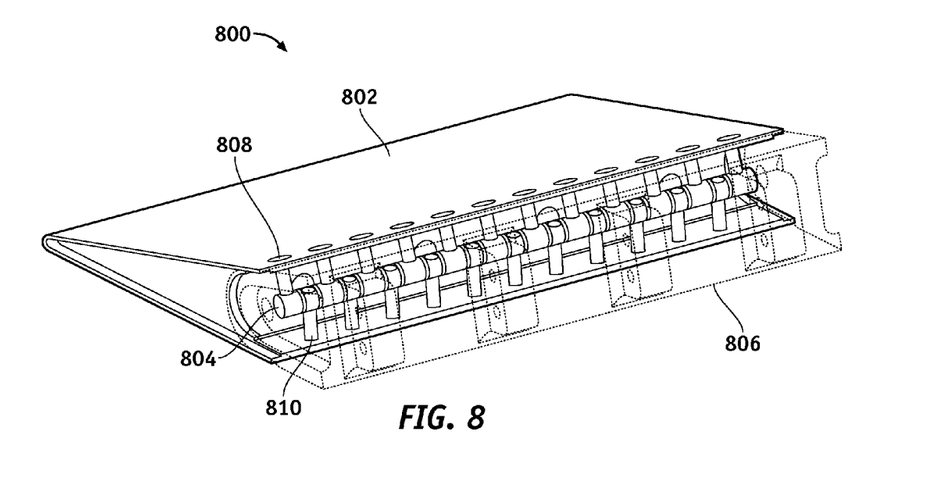
FIG. 8 is an illustration of an exemplary transparent view of a stay sharp fail-safe leading edge showing a barrel-nut attachment assembly component for coupling a heat pipe leading edge component to a fail-safe passive edge component according to an embodiment of the disclosure.

The fail-safe passive edge 610 is coupled to the high temperature surface 602 by attachment bolts 612/622 coupled to floating barrel-nuts 614/804. The attachment bolts 612/622 are fitted through slots 616/618 in the stay sharp fail-safe leading edge 600. The slots 616/618 may be shaped to allow for span-wise thermal growth. The fail-safe passive edge 610 is built to withstand similar temperatures and pressure to those required to be withstood by the high temperature surface 602; however, the fail-safe passive edge 610 need not meet the aerodynamic edge requirements for the high temperature surface 602. The fail-safe passive edge 610 comprises a high-temperature material such as, for example but without limitation, a carbon-carbon composite, and the like.

Due to its larger radius, the fail-safe passive edge 610 may have significantly higher drag than the high temperature surface 602, and may not be intended for extended high-speed flight operations. A C-C/SiC material system selected for the fail-safe passive edge 610 may, however, allow the vehicle to operate less efficiently, but without failure, at maximum Mach conditions for short periods of time to permit egress from denied areas followed by deceleration to a speed that may allow for partial completion of a mission or a safe abort scenario without substantially deforming or otherwise substantially compromising the primary structure.

The high temperature surface 602 is attached to the fail-safe passive edge 610 with the attachment bolts 612/622, for example but without limitation, multiple flush head Inconel shear bolts, and the like. The attachment bolts 612/622 can safely react both the moments and shear forces accumulated over the high temperature surface 602 due to aerodynamic loading during hypersonic flight while allowing for span-wise thermal growth of the high temperature surface 602 relative to the fail-safe passive edge 610. A hole bored along the span of the fail-safe passive edge 610 is used to couple the floating barrel-nuts 614 to the fail-safe passive edge 610. The floating barrel-nuts 614, which act as linear bearings, and slots in the fail-safe passive edge 610 allow for span-wise thermal growth. This attachment approach reacts aerodynamic loads allowing for differential thermal expansion and avoids the use of high temperature tension fasteners that have a tendency to lose preload under repeated thermal cycling.

Figure 7:
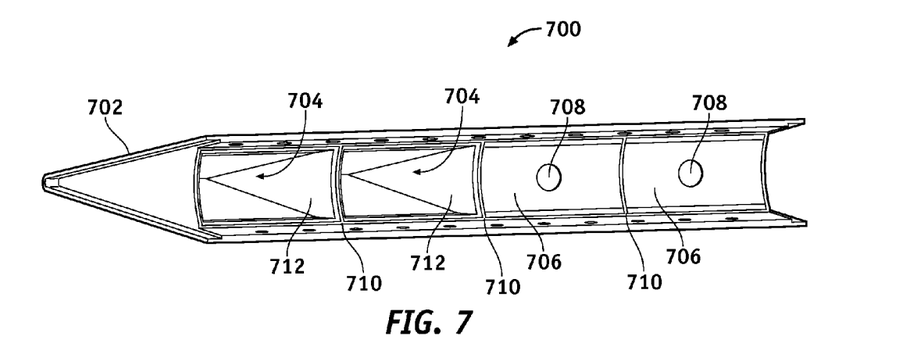
FIG. 7 is an illustration of an exemplary improved-reliability heat pipe leading edge showing a plurality of sub-chambers according to an embodiment of the disclosure.

FIG. 7 is an illustration of an exemplary improved-reliability heat pipe leading edge 700 (heat pipe leading edge 700) showing a plurality of sub-chambers 704 according to an embodiment of the disclosure. The heat pipe leading edge 700 comprises a wedge-shaped chamber 702 (high temperature surface 702), the sub-chambers 704, and a close-out plate 706 (end cap 706, 606 in FIG. 6).

The wedge-shaped chamber 702 comprises a non-porous material that is partitioned by at least one non-porous barrier wall 710 to form the sub-chambers 704. In the embodiment shown in FIG. 7, four sub-chambers 704 providing backup functionality for the heat pipe leading edge 700 are shown. However, any number of sub-chambers 704 suitable for operation of the heat pipe leading edge 700 may be used.

As mentioned above, the sub-chambers 704 are formed by the at least one non-porous barrier wall 710 partitioning the wedge-shaped chamber 702. The sub-chambers 704 each comprise a wick structure 712 respectively such that each of the sub-chambers 704 function individually as a heat pipe. The sub-chambers 704 are sized such that a loss of heat-pipe function in at least one of the sub-chambers 704 does not result in a failure of the improved-reliability heat pipe leading edge 700/400 providing the backup functionality mentioned above.

The close-out plate 706 is formed across rear surfaces of the sub-chambers 704 and seals the sub-chambers 704 to allow the sub-chambers 704 to function individually. The close-out plate 706 comprises a fill hole 708 (i.e., and associated fill hole plug such as plug 530) for each of the sub-chambers 704.

The heat pipe leading edge 700 provides sub-chambers 704 (vapor chambers) sized such that non-optimal operation in one of the sub-chambers 704 (vapor chamber) does not cause non-optimal operation of the entire heat pipe leading edge 700 assembly. The heat pipe leading edge 700 is attached to the fail-safe passive edge 610. In the embodiment shown in FIG. 7, the heat pipe leading edge 700 does not contain external welds in high heat flux areas. Assembly is accomplished with the advanced manufacturing approaches discussed herein and greatly improves the durability of the heat pipe leading edge 700. Although FIG. 6 shows the fail-safe passive edge 610 as the same span length as the heat pipe leading edge 700, an operational design may incorporate one or more fail-safe passive edge 610 much longer than a span length of the heat pipe leading edge 700. Thereby, embodiments of the heat pipe leading edge 700 may support more than one of the multiple heat pipe leading edge 700 each coupled to the fail-safe passive edge 610. A leading edge assembly that comprises one or more heat pipe leading edge 700 modules and the fail-safe passive edge 610, can be pre-assembled off a vehicle such as the hypersonic space access aerospace vehicle 300 and installed on a flight line. The leading edge assembly may be coupled (e.g., via attachment points 910/912 in FIG. 9) to a primary spar substructure using fasteners (not shown) comprising, for example but without limitation, titanium, Inconel, and the like, that allow for differential thermal expansion while reacting primary structural loads under flight conditions.

FIG. 8 is an illustration of an exemplary transparent view of a stay sharp fail-safe leading edge 800 showing a barrel-nut attachment assembly for coupling a heat pipe leading edge 802 to a fail-safe leading edge 806 according to an embodiment of the disclosure. The barrel-nut attachment assembly comprises floating barrel-nuts 804, top attachment bolts 808, and bottom attachment bolts 810. The heat pipe leading edge 400 is attached to the stay sharp fail-safe leading edge 500 with multiple top attachment bolts 808 and bottom attachment bolts 810. In this manner, the top attachment bolts 808 and the bottom attachment bolts 810 safely react both the moments and shear forces accumulated over the heat pipe leading edge 400 due to aerodynamic loading during hypersonic flight while allowing for span-wise thermal growth of the heat pipe leading edge 400/502 modules relative to the stay sharp fail-safe leading edge 500. A hole bored along the span of the stay sharp fail-safe leading edge 500 is used to house (e.g., locking) the floating barrel-nuts 614 that secure the attachment bolts 612/622 (e.g., alternating windward/leeward) attaching the heat pipe leading edge 400. The floating barrel-nuts 614/804, which acts as linear bearing, and slots 616 in the stay sharp fail-safe leading edge 500 allow for span-wise thermal growth. In this manner, this attachment approach effectively reacts aerodynamic loads, allows for differential thermal expansion and avoids the use of high temperature tension fasteners, which may have a tendency to lose preload under repeated thermal cycling.

Figure 9:
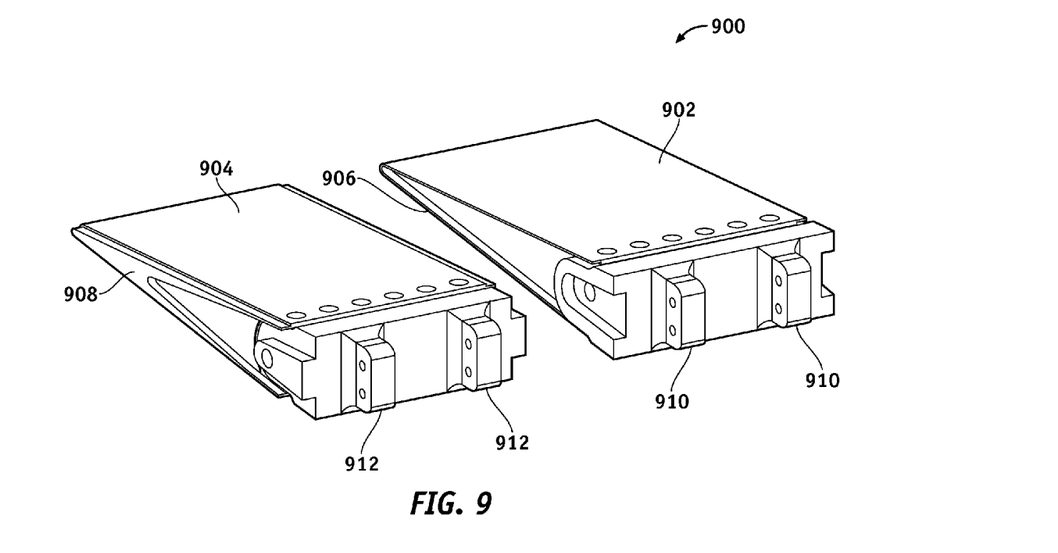
FIG. 9 is an illustration of an exemplary stay sharp fail-safe leading edge showing a first stay sharp fail-safe leading edge comprising an outer mold line (OML) extended edge and a second stay sharp fail-safe leading edge comprising an inset extended edge according to an embodiment of the disclosure.

FIG. 9 is an illustration of an exemplary stay sharp fail-safe leading 900 showing a first stay sharp fail-safe leading edge 902 comprising an outer mold line (OML) extended edge 906 and a second stay sharp fail-safe leading edge 904 comprising an inset extended edge 908 according to an embodiment of the disclosure. The first stay sharp fail-safe leading edge 902 comprises attachment points 910, and the second stay sharp fail-safe leading edge 904 comprises attachment points 912. In this manner, a modular assembly is provided to facilitate ease of maintenance of the stay sharp fail-safe leading edge 900. Modularity of the first and second stay sharp fail-safe leading edge 902/904 (modules 902/904) allows for efficient access, inspection, servicing, repair, or replacement via removing at most three of the modules 902/904, as opposed to disassembling an entire edge in existing approaches.

Figure 10:
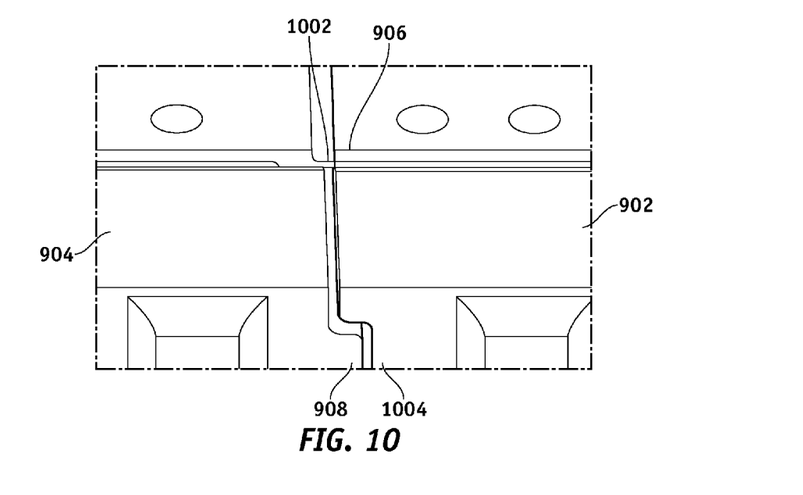
FIG. 10 is an illustration of an exemplary OML extended edge coupled to an inset extended edge according to an embodiment of the disclosure.

FIG. 10 is an illustration of an exemplary OML extended edge 906 coupled to the inset extended edge 908 according to an embodiment of the disclosure. In this manner, a gap 1002 and a gap 1004 are provided to allow for thermal expansion of the stay sharp fail-safe leading edge 902/904 at high temperatures. Adjacent modules 902/904 comprise overlapping surface of the OML extended edge 906 incorporates a rabbet joint formed by the gap 1002 and the gap 1004. In this manner, the stay sharp fail-safe leading edge 900 allows removal of the modules 902/904 while preventing undesired bypass flows and accommodating the expected growth from thermal expansion. Modules 902/904 alternate being either male or female so that no more than three modules will have to be removed to replace a module. This is superior to designs that require the entire leading edge to be disassembled or removed for access to the supporting structure.

Figure 11A:
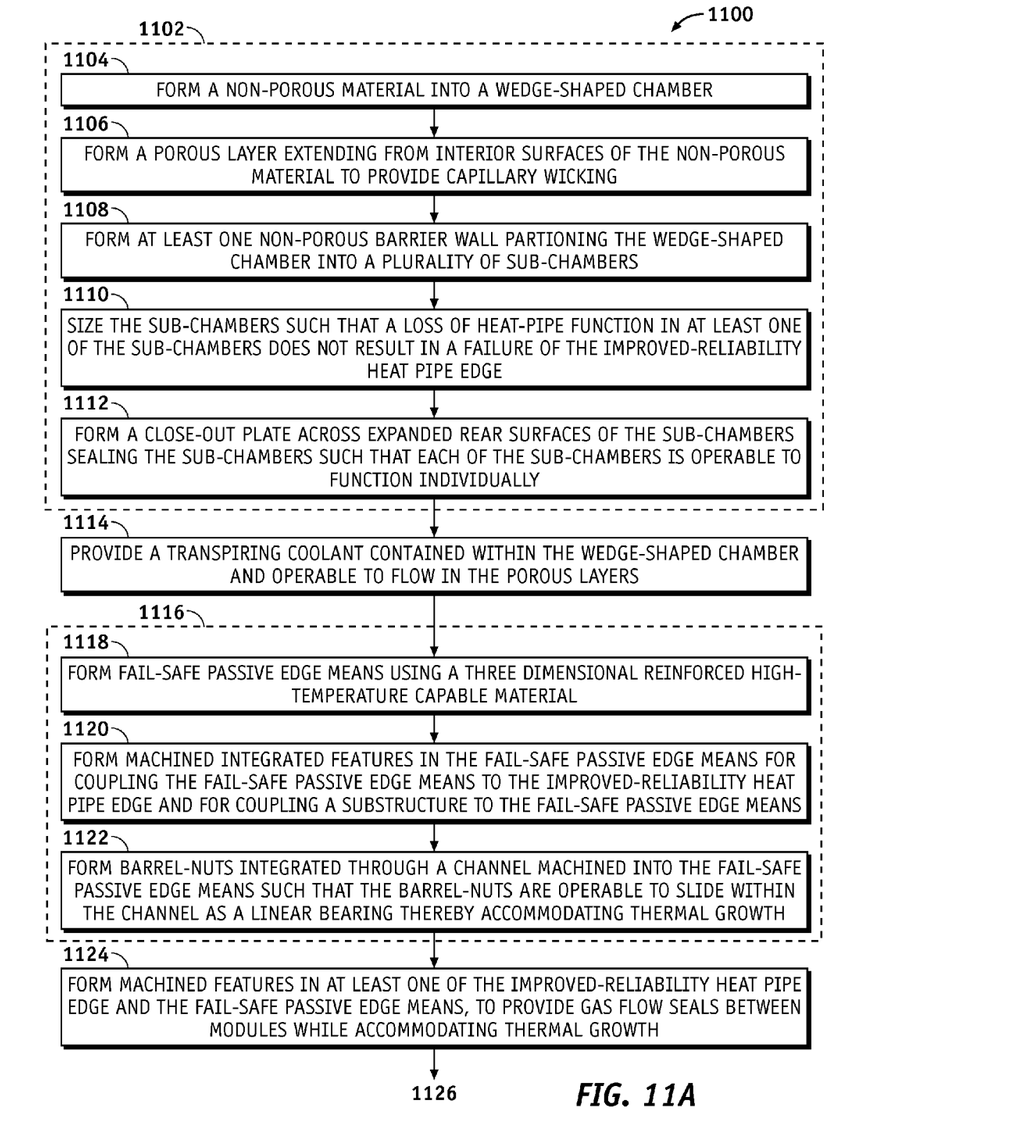
FIGS. 11A and 11B are illustrations of an exemplary flow chart showing a process for providing a passive non-ablating thermally protective structure body according to an embodiment of the disclosure.
Figure 11B:
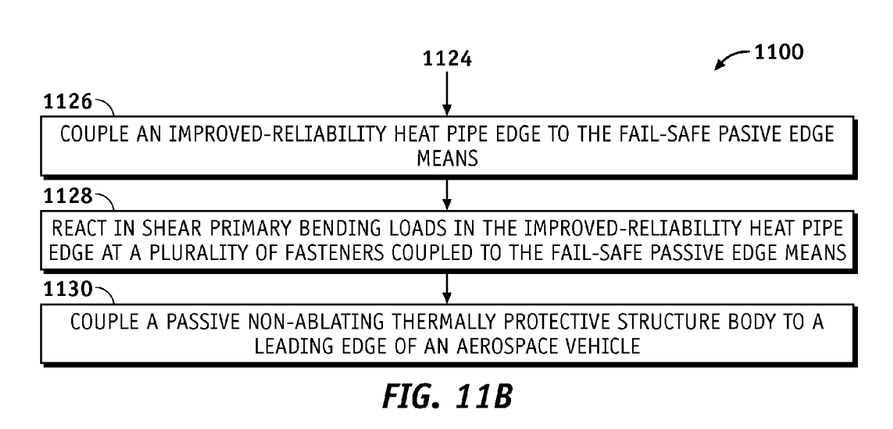

FIGS. 11A and 11B are illustrations of an exemplary flow chart showing a process for providing a passive non-ablating thermally protective structure body according to an embodiment of the disclosure. The various tasks performed in connection with process 1100 may be performed mechanically, by software, hardware, firmware, or any combination thereof. For illustrative purposes, the following description of process 1100 may refer to elements mentioned above in connection with FIGS. 1-10. In practical embodiments, portions of the process 1100 may be performed by different elements of the heat pipe leading edge 400 of the stay sharp fail-safe leading edge 302/500 such as the high temperature surface 402, the internal wick structure 404, and the internal plenum chamber 406. Process 1100 may have functions, material, and structures that are similar to the embodiments shown in FIGS. 1-10. Therefore common features, functions, and elements may not be redundantly described here.

Process 1100 may begin by fabricating an improved-reliability heat pipe edge such as the heat pipe leading edge 400 (task 1102). In this manner, process 1100 may form a non-porous material such as the high temperature surface 402 into a wedge-shaped chamber (task 1104) such as the internal plenum chamber 406. The process 1100 may then form a porous layer such as the internal wick structure 404 extending from interior surfaces of the non-porous material to provide capillary wicking (task 1106). The process 1100 may then form at least one non-porous barrier wall partitioning the wedge-shaped chamber into a plurality of sub-chambers (task 1108). The process 1100 may then size the sub-chambers such that a loss of heat-pipe function in at least one of the sub-chambers does not result in a failure of the improved-reliability heat pipe edge (task 1110). The process 1100 may then form a close-out plate across expanded rear surfaces of the sub-chambers sealing the sub-chambers such that each of the sub-chambers functions individually (task 1112).

The non-porous material and the porous layer may be formed by, for example but without limitation, the additive manufacturing means, the plunge electrical discharge machining as explained above, and the like. The non-porous material may substantially enclose the porous layer. For example, as mentioned above the high temperature surface 402 encloses the internal wick structure 404 and the internal plenum chamber 406, thereby forming the heat pipe leading edge 400.

Additive manufacturing technology, as described above, enables a new approach for producing these challenging structures, and provides cost advantage for a platform that may not reach high rates of production. Additive manufacturing also allows for design flexibility for fabrication of multiple variants, and is lower cost and lower risk than superplastic forming and diffusion bonding approach. Additive manufacturing also allows for non-constant thickness, unlike a sheet metal/welding approach.

The plunge EDM method described above can create a hermetic, leak-free heat pipe leading edge 400. The use of plunge EDM allows us to create high aspect ratio vapor chambers with controlled wall thickness and good surface finish in fewer steps and with better quality than conventional machining. This manufacturing approach will significantly improve the overall reliability of the heat pipe leading edge 400 modules. Methods are lower cost and lower risk than a sheet metal/welding approach. Welds in prior existing designs can be unreliable in aggressive high-heat-flux environments. The heat pipe leading edge 400 modules welds are only located in the coolest condenser region, far from the leading edge 408.

Process 1100 may then continue by providing a transpiring coolant contained within the wedge-shaped chamber such as the internal plenum chamber 406 and operable to flow in the porous layer such as the internal wick structure 404 (task 1114). Oxygen cannot be present in a system that includes liquid sodium metal, and generally, it may be difficult to prevent contamination without a vacuum, even under an inert gas blanket. A use of vacuum electron-beam welding can prevent contamination of the internal wick structure 404.

Process 1100 may then continue by providing a fail-safe passive edge means such as the fail-safe passive edge 504 operable to provide a secondary thermal protection (task 1116). In this manner, process 1100 may then form the fail-safe passive edge means using the three-dimensional fiber reinforced high-temperature capable material (task 1118) as explained above. Process 1100 may then form machined integrated features in the fail-safe passive means for coupling the fail-safe passive edge means to the improved-reliability heat pipe edge such as the heat pipe leading edge 400 and for coupling a substructure to the fail-safe passive edge means (task 1120). Process 1100 may then form floating barrel-nuts such as the floating barrel-nuts 614/804 (e.g., integrated) through a channel such as a channel 620 machined into the fail-safe passive edge means such that the floating barrel-nuts 614/804 are operable to slide within the channel 620 as a linear bearing thereby accommodating thermal growth (task 1122).

Process 1100 may then form machined features in at least one of the improved-reliability heat pipe edge and the fail-safe passive edge means, to provide gas flow seals between modules while accommodating thermal growth (task 1124).

Process 1100 may then continue by coupling the improved-reliability heat pipe edge such as the heat pipe leading edge 400/502/700/802 to the fail-safe passive edge means (task 1126).

Process 1100 may then continue by reacting in shear primary bending loads in the improved-reliability heat pipe edge (heat pipe leading edge 400/502/700) at a plurality of attachment bolts/fasteners 612/622 coupled to the fail-safe passive edge means (task 1128). Secondary thermal protection of the fail-safe passive edge means is substantially equivalent to a primary thermal protection of the heat pipe leading edge 400/502/700.

Process 1100 may then continue by coupling the passive non-ablating thermally protective structure body, provided by the process 1100 to the hypersonic space access aerospace vehicle 300 (task 1130) to provide the stay sharp fail-safe leading edge 302.

Figure 12:
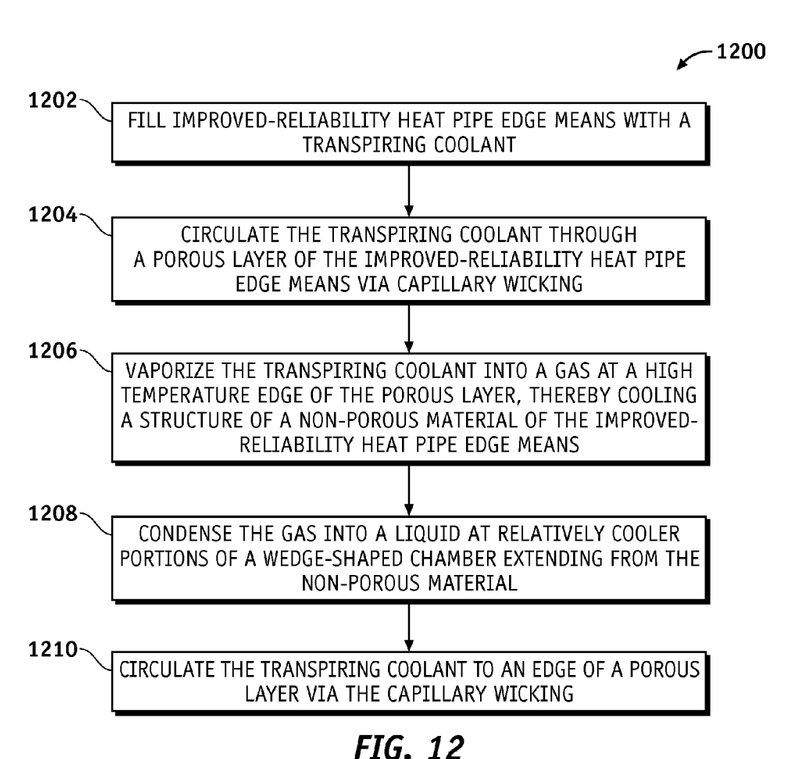
FIG. 12 is an illustration of an exemplary flow chart showing a process for using an improved-reliability thermally protective structure body according to an embodiment of the disclosure.

FIG. 12 is an illustration of an exemplary flow chart showing a process for using an improved-reliability thermally protective structure body according to an embodiment of the disclosure. The various tasks performed in connection with process 1200 may be performed mechanically, by software, hardware, firmware, or any combination thereof. For illustrative purposes, the following description of process 1200 may refer to elements mentioned above in connection with FIGS. 1-10. In practical embodiments, portions of the process 1200 may be performed by different elements of the heat pipe leading edge 400 of the stay sharp fail-safe leading edge 302 such as the high temperature surface 402, the internal wick structure 404, and the internal plenum chamber 406. Process 1200 may have functions, material, and structures that are similar to the embodiments shown in FIGS. 1-10. Therefore common features, functions, and elements may not be redundantly described here.

Process 1200 may begin by filling improved-reliability heat pipe leading edge means such as the heat pipe leading edge 400 with a transpiring coolant (task 1202).

Process 1200 may then continue by circulating the transpiring coolant through a porous layer of the improved-reliability heat pipe edge means such as the internal wick structure 404 via capillary wicking (task 1204).

Process 1200 may then continue by vaporizing the transpiring coolant into a gas at a high temperature edge of the porous layer such as the wick leading edge 418 of the internal wick structure 404, thereby cooling a structure of a non-porous material of the improved-reliability heat pipe edge means such as the leading edge 408 of the high temperature surface 402 (task 1206).

Process 1200 may then continue by condensing the gas into a liquid at relatively cooler portions of a wedge-shaped chamber region extending from the non-porous material (task 1208). The relatively cooler portions may comprise the first wick sidewall 420, the second wick sidewall 422, and the wick end cap 424.

Process 1200 may then continue by circulating the transpiring coolant to an edge of the porous layer such as the wick leading edge 418 via the capillary wicking (task 1210)

In this manner, embodiments provide methods and structures for producing performance-enabling heat pipe leading edge structures for applications such as hypersonic vehicles.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-10 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A passive non-ablating thermally protective structure body comprising:
    an improved-reliability heat pipe edge comprising:
        a non-porous material formed into a wedge-shaped chamber comprising an end cap opposite a leading edge of the wedge-shaped chamber; and
        a porous layer extending from interior surfaces of the non-porous material to provide capillary wicking formed as a single object with the wedge-shaped chamber; and
    a fail-safe passive edge located behind and coupled to the end cap, and coupled to the improved-reliability heat pipe edge by at least one attachment fastener.

2. The passive non-ablating thermal protection structure body of claim 1, further comprising:
    a plurality of sub-chambers formed by at least one non-porous barrier wall partitioning the wedge-shaped chamber, the sub-chambers sized such that a loss of heat-pipe function in at least one of the sub-chambers does not result in a failure of the improved-reliability heat pipe edge; and
    a close-out plate formed across rear surfaces of the sub-chambers sealing the sub-chambers such that each of the sub-chambers is operable to function individually.

3. The passive non-ablating thermal protection structure body of claim 1, further comprising a transpiring coolant contained within the wedge-shaped chamber and operable to flow as vapor in the wedge-shaped chamber and as a liquid in the porous layer.

4. The passive non-ablating thermal protection structure body of claim 3, wherein the transpiring coolant comprises one of the group consisting of: sodium, lithium, potassium, and molten salt.

5. The passive non-ablating thermal protection structure body of claim 1, wherein the passive non-ablating thermally protective structure body is coupled to a leading edge of an aerospace vehicle.

6. The passive non-ablating thermal protection structure body of claim 1, wherein the fail-safe passive edge comprises a substructure comprising a low coefficient-of-thermal-expansion material operable to provide a secondary thermal protection capability substantially equivalent to a primary thermal protection provided by the improved-reliability heat pipe edge.

7. The passive non-ablating thermal protection structure body of claim 1, wherein the improved-reliability heat pipe edge is formed by at least one of the group consisting of: additive manufacturing means, and plunge electric discharge machining.

8. A method for providing a passive non-ablating thermally protective structure body, the method comprising:
    fabricating an improved-reliability heat pipe edge by:
        forming a non-porous material into a wedge-shaped chamber comprising an end cap opposite a leading edge of the wedge-shaped chamber;
        forming a porous layer extending from interior surfaces of the non-porous material to provide capillary wicking; and
    forming a fail-safe passive edge at a location behind and coupled to the end cap, and coupled to the improved-reliability heat pipe edge by at least one attachment fastener.

9. The method according to claim 8, further comprising:
    forming at least one non-porous barrier wall partitioning the wedge-shaped chamber into a plurality of sub-chambers;
    sizing the sub-chambers such that a loss of heat-pipe function in at least one of the sub-chambers does not result in a failure of the improved-reliability heat pipe edge; and
    forming a close-out plate across expanded rear surfaces of the sub-chambers sealing the sub-chambers such that each of the sub-chambers is operable to function individually.

10. The method according to claim 8, further comprising providing a transpiring coolant contained within the wedge-shaped chamber and operable to flow in the porous layer.

11. The method according to claim 8, further comprising substantially enclosing the porous layer with the wedge-shaped chamber.

12. The method according to claim 8, further comprising:
    forming the wedge-shaped chamber by additive manufacturing; and
    forming the porous layer by additive manufacturing.

13. The method according to claim 8, further comprising: forming the wedge-shaped chamber and the porous layer as a single object by additive manufacturing by repetitively solidifying layers of material until a 3-D part is formed.

14. The method according to claim 8, wherein the fail-safe passive edge provides a secondary thermal protection substantially equivalent to a primary thermal protection provided by the improved-reliability heat pipe edge.

15. The method according to claim 8, further comprising reacting in shear primary bending loads in the improved-reliability heat pipe edge at the at least one attachment fastener coupled to the fail-safe passive edge.

16. The method according to claim 8, further comprising:
    forming the fail-safe passive edge using a three dimensional reinforced high-temperature capable material;
    forming machined integrated features in the fail-safe passive edge for coupling the fail-safe passive edge to the improved-reliability heat pipe edge and for coupling a substructure to the fail-safe passive edge; and
    forming barrel-nuts integrated through a channel machined into the fail-safe passive edge such that the barrel-nuts are operable to slide within the channel as a linear bearing thereby accommodating thermal growth.

17. The method according to claim 8, further comprising forming machined features in at least one of the improved-reliability heat pipe edge and the fail-safe passive edge, to provide gas flow seals between modules while accommodating thermal growth.

18. The method according to claim 8, further comprising coupling the passive non-ablating thermally protective structure body to a leading edge of an aerospace vehicle.

19. A method for providing a passive non-ablating thermally protective structure body, the method comprising:
    fabricating an improved-reliability heat pipe edge by:
        forming a non-porous material into a wedge-shaped chamber;
        forming a porous layer extending from interior surfaces of the non-porous material to provide capillary wicking; and
    forming the wedge-shaped chamber and the porous layer as a single object by additive manufacturing by repetitively solidifying layers of material until a 3-D part is formed.

20. The method of claim 19, further comprising forming a fail-safe passive edge at a location behind and coupled to an end cap, and coupled to the improved-reliability heat pipe edge by at least one attachment fastener, wherein the wedge-shaped chamber comprises the end cap opposite a leading edge of the wedge-shaped chamber.

* * * * *